(12) United States Patent
Bruck et al.

(10) Patent No.: US 11,440,138 B2
(45) Date of Patent: Sep. 13, 2022

(54) OPTIMIZATION OF MELT POOL SHAPE IN A JOINING PROCESS

(71) Applicant: Siemens Energy, Inc., Orlando, FL (US)

(72) Inventors: Gerald J. Bruck, Myrtle Beach, SC (US); Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 256 days.

(21) Appl. No.: 16/281,185

(22) Filed: Feb. 21, 2019

(65) Prior Publication Data

US 2019/0176265 A1     Jun. 13, 2019

Related U.S. Application Data

(62) Division of application No. 14/336,215, filed on Jul. 21, 2014, now abandoned.

(51) Int. Cl.
*B23K 26/26* (2014.01)
*B23K 26/06* (2014.01)
(Continued)

(52) U.S. Cl.
CPC ............ *B23K 26/26* (2013.01); *B23K 26/067* (2013.01); *B23K 26/0608* (2013.01);
(Continued)

(58) Field of Classification Search
CPC .. B23K 26/26; B23K 26/0608; B23K 26/067; B23K 26/083; B23K 26/0869;
(Continued)

(56) References Cited

U.S. PATENT DOCUMENTS 5,467,218 A * 11/1995 Takeda ................. H01S 3/06708
359/341.3
5,616,261 A * 4/1997 Forrest ................. B23K 26/067
219/121.63

(Continued)

FOREIGN PATENT DOCUMENTS

| CN | 103817439 A | 5/2014 |
|---|---|---|
| JP | H07251284 A | 10/1995 |
| JP | 2012152820 A | 8/2012 |

OTHER PUBLICATIONS

Wu Shengchuan et al; "Laser Welding and Performance Evaluation of Aluminum Alloy"; Jan. 2014; pp. 128-129.

*Primary Examiner* — Erin E McGrath

(57) ABSTRACT

A process of welding a superalloy is provided. The process includes applying a first amount of energy to a substrate comprised of the superalloy to form a melt pool along a length of the substrate and in a weld direction. The process also comprises advancing the melt pool in the weld direction along the length via the first amount of energy, the melt pool having a width transverse to the weld direction. Further, the process includes applying a second amount of energy to the substrate that extends outside the width of the melt pool at a trailing edge of the melt pool, which second amount of energy causes, relative to a process without application of the second amount of energy: broadening of the width of the melt pool at the trailing edge of the melt pool as the melt pool advances in the weld direction; and reducing segregation of artifacts and stress concentration along a centerline of the width.

8 Claims, 4 Drawing Sheets

(51) Int. Cl.
  *B23K 26/067* (2006.01)
  *B23K 26/08* (2014.01)
  *B23K 26/32* (2014.01)
  *B23K 26/082* (2014.01)
  *B23K 26/70* (2014.01)
  *B23K 103/18* (2006.01)

(52) U.S. Cl.
  CPC .......... *B23K 26/082* (2015.10); *B23K 26/083* (2013.01); *B23K 26/0869* (2013.01); *B23K 26/32* (2013.01); *B23K 26/70* (2015.10); *B23K 2103/26* (2018.08)

(58) Field of Classification Search
  CPC ...... B23K 26/32; B23K 26/082; B23K 26/70; B23K 2103/26
  See application file for complete search history.

(56) References Cited

U.S. PATENT DOCUMENTS

| | | | | |
|---|---|---|---|---|
| 6,054,672 | A * | 4/2000 | Foster | B23K 26/32 |
| | | | | 219/121.66 |
| 6,444,947 | B1 * | 9/2002 | Bonss | B23K 26/0604 |
| | | | | 219/121.63 |
| 6,972,390 | B2 * | 12/2005 | Hu | B23K 26/032 |
| | | | | 219/121.64 |
| 2005/0121426 | A1 * | 6/2005 | Wang | B23K 26/244 |
| | | | | 219/121.64 |

* cited by examiner

OPTIMIZATION OF MELT POOL SHAPE IN A JOINING PROCESS

FIELD

The present invention relates to joining processes, and more particularly to processes for shaping a melt pool during a joining process.

BACKGROUND

Various processes are known for joining materials, which may collectively refer to the joinder of two or more substrates, as well as the repair or enhancement of one or more substrates. For example, conduction welding and keyhole welding are known processes for the joining of materials. As shown in FIG. 1, in keyhole welding, an entire thickness of a portion of the substrate 10 may be melted via an energy source 12 into a melt pool 14. In this way, a keyhole 16 is formed through the entire thickness of the melt pool 14 of the substrate 10. As the process traverses in the direction of travel of the weld, the melt pool 14 and associated keyhole 16 also traverse the substrate 10 in a direction of the weld 18. The molten material of the melt pool 14 solidifies into a weld bead 20 behind the keyhole 16 as the keyhole advances. In the embodiment shown, an inert gas 21 is provided around the melt pool to prevent oxidation of the substrate or other process material and (likely with supplemental gas) to suppress any plasma forming at the surface. In conduction welding, the energy source 12 provides an amount of energy that is insufficient to form a keyhole 16 as was shown in FIG. 1. Instead of forming a keyhole, heat is conducted into the substrate 10 from a surface of the substrate 10.

A number of issues may arise during formation of the melt pool. The first involves segregations of problematic elements and constituents. The second involves concentrated tensile stress. The third involves entrapment of voids particular to keyhole welding. With respect to segregations, it is appreciated that weld pool shape greatly influences susceptibility to weld cracking during the process of solidification. Solidifying grains grow normal to the solid-liquid interface (in the direction of maximum temperature gradient) and grow epitaxially with grain orientation most preferred with respect to the adjoining solid. Such shapes and grain orientations may significantly affect cracking. For tear drop-shaped weld pools of linear solid liquid interface, grains of parallel alignment form on each side of the pool (as viewed in 2D). Viewed in 3D, the grains also form roughly perpendicular to the sides of a cone. The grains terminate their solidification at the weld centerline (last location to solidify). Such grains also tend to be relatively large because there is no change in direction of solidification (from each linear side) and grains of preferred orientation can simply extend themselves toward the weld centerline.

Low melting point elements (e.g., sulfur and phosphorous) and similar constituents (compounds such as eutectics) naturally concentrate at the last point of solidification. Such constituents are known to aggravate solidification cracking because they may not sustain the stresses of final solidification. Referring to FIG. 2, in the case of tear drop shaped weld pools 22, such constituents 32 segregate at the weld centerline 30 and are spread over relatively few and coarse grain boundaries. Such segregation expectedly leads to weld solidification cracking.

In addition, cracking may occur as a result of tensile stress and as a result of a crack prone microstructure. It is postulated that in addition to affecting segregations that promote the latter crack prone microstructure, weld pool shape also affects stress distributions important for crack-free solidification. Stress concentrations in welds are complex and dependent on many factors, but likely the most important factor involves heat management. The restraint of the solid metal adjoining the solidifying melt is very important to such stress management. For example, a fully restrained substrate requires the solidifying melt to sustain all contraction stresses. Alternately, a non-constrained substrate accommodates shrinkage strains and is far less susceptible to cracking. Processes that are able to distribute such stresses are thus desired.

Further, it is appreciated that initiation and termination of keyhole mode laser welds requires transitioning from a conduction mode to the keyhole mode to a conduction mode of welding (respectively). That is, when the laser beam is first directed to the substrate, it first produces a shallow melt pool. Translation and further energy delivery develops a through section keyhole. Such development involves turbulent motion of the melt and is prone to defect generation, e.g., porosity. Upon weld termination, through section penetration transitions to partial penetration and a hole surrounded by the molten metal transitions to a shallow melt pool. The molten geometric changes involved in such transitioning are prone to trapping of weld defects.

Still further, in keyhole welding, the melt pool 14 may be characterized by a high depth to width (aspect) ratio in the substrate 10 due to the concentration of energy and speed of the welding process. Due to the high aspect ratio of the keyhole 16 and the speed of welding, voids (porosity) may form near the midpoint of a depth of the melt pool 14 remote from the melt pool surface. The voids may become trapped in the solidifying melt pool before the pores are able to travel to the melt pool surface. This effect is magnified by the presence of the tear drop shape (FIG. 2), which provides less area for the defects to escape. Compared to keyhole welding, conduction welding provides a melt pool that is generally more shallow and wide, but may still have a tear drop shaped melt pool as described herein.

BRIEF DESCRIPTION OF THE DRAWINGS

The invention is explained in the following description in view of the drawings that show.

DETAILED DESCRIPTION

Aspects of the present invention are directed to processes and systems that strongly influence the shape of the melt pool in a joining process, such as a keyhole welding or a conduction welding process, relative to known processes. In accordance with one aspect of the present invention, there is provided a process for welding comprising applying a first amount of energy and a second amount of energy to the substrate effective to provide a melt pool comprising a curvilinear and curviplanar solid/liquid interface. As will be described herein, the contoured melt pool reduces segregation of artifacts and stress concentration within a depth and along a centerline of a width of the melt pool, as well as reduces a likelihood of void entrapment in the melt pool relative to a more tear drop shaped melt pool, for example.

More specifically, with a curvilinear and curviplanar solid/liquid interface, grains of highly varied alignment form on each side of the melt pool. The grains tend to curve toward the forward travel direction. Such grains also tend to be relatively small because there is continuous change in direction of solidification and grains of preferred orientation initiate and compete with advantage over grains of less preferred orientation. Further, undesirable artifacts may spread throughout the solidifying weld and/or over many fine grain boundaries. Propensity for weld solidification cracking is thereby reduced.

In addition, it is appreciated that while melt pool shape may not directly affect restraint of the solid metal adjoining the solidifying melt, the melt pool shape may affect the direction and concentration of the resultant tensile stresses that typically, in conjunction with restraint, result in cracking. It is important that such stresses are not concentrated but rather distributed. Another key benefit of the processes described herein is that melt pool shape control and process heat management may result in distributing such stresses.

Further, the weld shape control processes described herein may improve the avoidance of deep penetration weld defects. Application of process energy in the wake of a deep penetration weld, for example, may shape the melt pool to transition from keyhole to conduction mode welding in a manner so as to minimize turbulence. Such transitioning can effectively avoid generation of inclusions and voids and/or enhance the opportunity for voidage to clear to the surface of the melt pool and to dissipate thereon.

Figure 2:
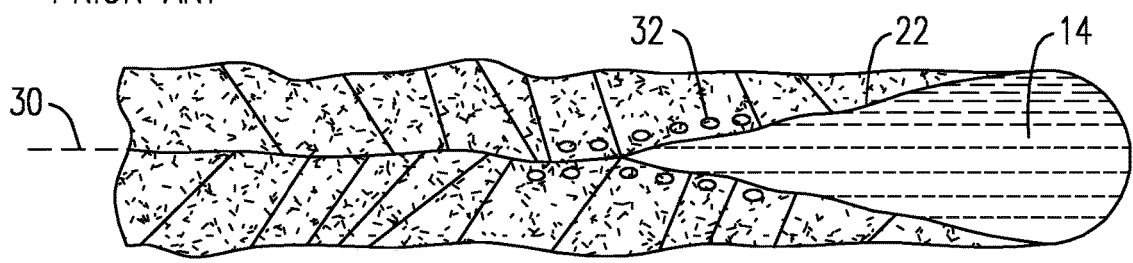
FIG. 2 illustrates a top view of the tear drop shaped melt pool formed by the prior art process of FIG. 1.

In particular embodiments, the substrate is heated outside of the melt pool to intentionally reduce a cooling rate or solidification rate of the melt pool and to effectively broaden the melt pool at least at a trailing edge region thereof (relative to processes without a heating outside the melt pool step). In other embodiments, an inner region of the forming melt pool is heated so as to affect the shape of the melt pool. In either case, the widening of the melt pool at the trailing edge region creates more area for contaminants or voidage, for example, within the melt pool to be removed, as well as reduces segregation of artifacts along the centerline of the melt pool as was shown in FIG. 2. The resulting solidified weld bead with reduced artifact segregation will be significantly stronger upon solidification.

Figure 3A:
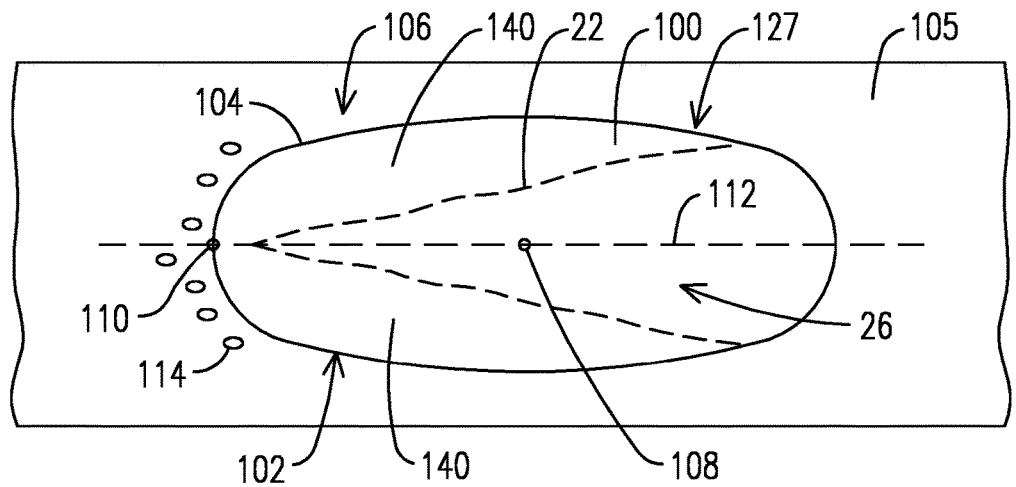
FIG. 3A-3B illustrate a contour shaped melt pool having a solid/liquid interface in accordance with an aspect of the present invention.
Figure 3B:
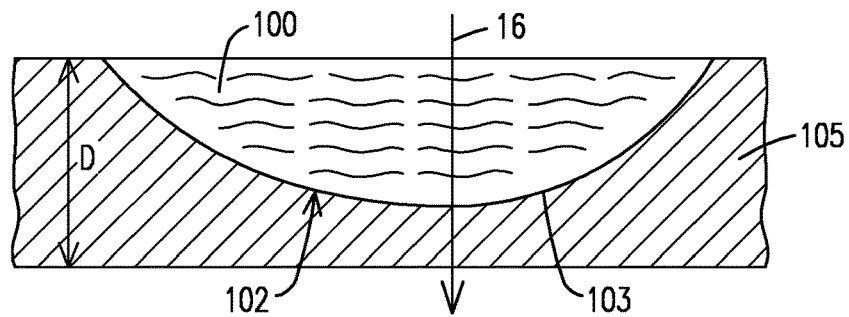

By way of example, with reference to FIGS. 3A-3B, there is shown a melt pool 100 on a substrate 105 which is widened relative to the teardrop shape melt pool 22 of the prior art described above (shown in dotted lines in FIG. 3). FIG. 3A shows the melt pool 100 from a top view in 2D while FIG. 3B shows the contoured shape 102 in a depth (D) of the melt pool 100. A curviplanar solid/liquid interface 103 is shown between the melt pool 100 and the solid portion of the substrate 105 adjacent the melt pool 100. The solid line in FIG. 3A represents the periphery 104 of the melt pool 100 having the contoured shape 102. In certain embodiments, the melt pool 100 is provided with the contoured shape 102 at least at a trailing edge region 106 of the melt pool 100. As used herein, the term "trailing edge region" refers to the rear half of the melt pool 100, such as any area of the melt pool 100 that is disposed between a vertical plane extending through a midpoint 108 (transverse to the direction of travel) and a rearmost point 110 of the melt pool 100. It is appreciated however, that the area of the melt pool in front of the trailing edge region 106 (leading edge region 127) may also be broadened by the processes described herein. In any case, via the increased broadened and/or contoured shape relative to prior art processes, artifacts 114 will not segregate toward the centerline 112 as solidification occurs, but instead will be distributed more evenly about the perimeter of the melt pool 100 as shown in FIG. 3A. Thus, upon solidification, the substrate avoids weakening normally caused by centerline segregation of artifacts.

Various processes are contemplated to produce a melt pool 100 on a substrate 105 having the contoured shape 102 described herein and shown in FIGS. 3A-3B. A number of processes will be described below; however, it is understood that the present invention is not so limited to any particular embodiment. By way of example only, the processes described herein may be utilized to join two substrates edge to edge, to repair one or more substrates, to enhance one or more substrates (by the addition of additional superalloy powder, for example, in front of the melt pool or therein), or as a way to build smaller substrates into larger assemblies.

Figure 4:
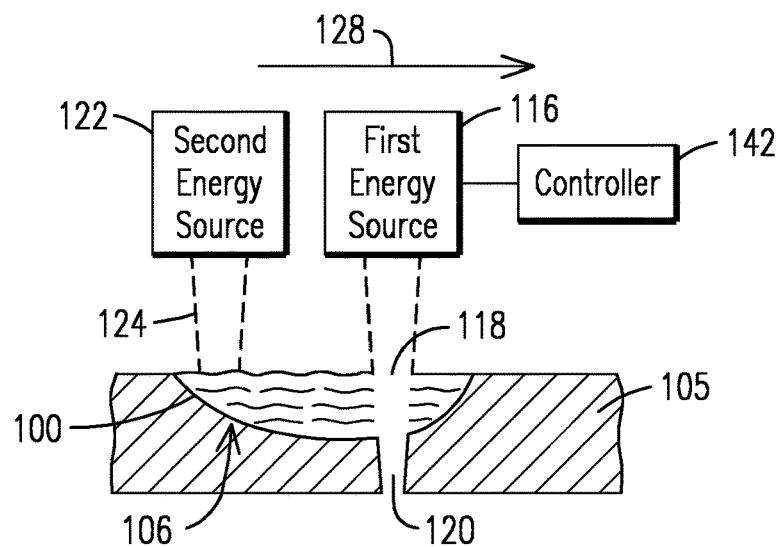
FIG. 4 illustrates a process of welding for forming a contoured melt pool in accordance with an aspect of the present invention.

Referring to FIG. 4, there is shown an exemplary welding process to form a melt pool 100 with at least a trailing edge region 106 having the contoured shape 102 (FIG. 3). It is appreciated that the melt pool is typically continuously advanced through the substrate 105 creating a weld seam. FIG. 4 thus represents the formation of a melt pool at a point in time with an area behind thereof which may have already been melted and resolidified and an area in front which has yet to be contacted by an energy source.

In the embodiment shown, a first energy source 116 provides a first amount of energy 118 to the substrate 105. In certain embodiments, the first amount of energy 118 may be sufficient to form a keyhole 120 through the substrate 105 and a melt pool 100 about the keyhole 120. In other embodiments, the first amount of energy 118 solely forms a melt pool 100 but does not form a keyhole 120 as is the case in conduction welding. In any case, the melt pool 100 provided by the first amount of energy 118 may not have an optimal shape, e.g. has a tear drop shape 22, such as that shown in FIG. 2 if no other actions were taken.

Figure 5:
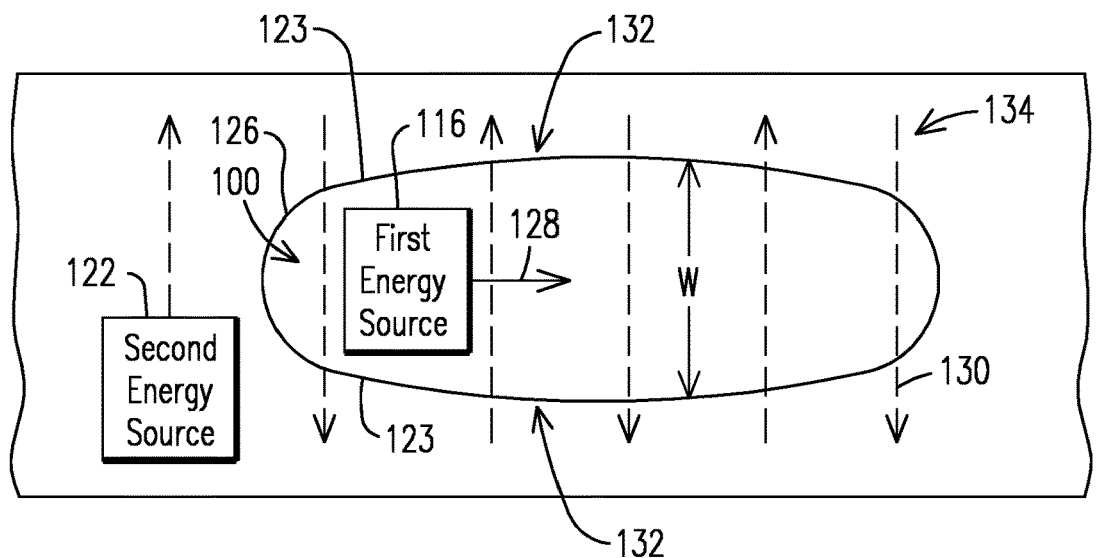
FIG. 5 illustrates the path of travel of a first energy source and a second energy source in a process in accordance with an aspect of the present invention.

To provide the melt pool 100 with the contoured shape 102, a second energy source 122 may be utilized so as to deliver a second amount of energy 124 outside the width (W) of the melt pool 100 to provide the trailing edge region 106 with a contoured shape 102 as was shown in FIGS. 3A-3B. Alternately, the first amount of energy 118 and the second amount of energy 124 may be provided from the same energy source. For example, the first energy source 116 may be rapidly time shared with distinct amounts of energy momentarily directed to remote locations, such as by programmed oscillations of galvanometer driven scanning laser beam optics. In an embodiment, the second amount of energy 124 is applied in a region outside a width (W) of the melt pool 100. For example, the second amount of energy 124 may be applied to regions 132 on one or more of the opposed sides of the melt pool 100 forming in the substrate 105 as will be explained in further detail below and as shown in FIG. 5. In certain embodiments, the second amount of energy 124 is also applied within a width (W) of the melt pool 100, which may also widen and shape the melt pool 100.

In this embodiment, the second amount of energy 124 heats the region outside the width (W), but is insufficient in of itself to melt the substrate in the regions 132. It is appreciated, however, that the heat from the melt pool 100 may be sufficient to melt a portion of the substrate 105, particularly at the periphery of the melt pool 100. The heating of the region outside the width (W) of the melt pool 100 increases a temperature of the substrate 105 about the melt pool 100, and is thus effective to decrease a resolidificaiton rate of the melt pool, such as in a direction of travel of the weld. In addition, the cooling rate reduction about the melt pool 100 is effective to influence, e.g., broaden (relative to a process without such side heating), a shape of the trailing edge region 106 of the melt pool 100 since by decreasing the cooling rate. Through control of the pattern of application of the second amount of energy 124, the contoured shape 102 of the melt pool 100 can be formed. In an embodiment, the second amount of energy 124 is selected to heat the substrate 105 and nearby solidified deposit to a temperature that is from 1 to 300° C. below its melting temperature.

In an embodiment, the first and second energy sources (whether distinct or a time shared single source) 116, 122 may be moved collectively in the direction of the weld 128 along a length of the substrate 105. Alternatively, the substrate 105 may be moved in the direction of the weld 128 with respect to energy sources 116, 122 which may be rendered stationary.

Further, the first and second energy sources 116, 122 may be moved in the same direction as one another. In another embodiment, as shown in FIG. 5, one energy source 116 may be moved in a first direction and the second energy source 122 may be moved in a distinct second direction. For example, as shown in FIG. 5, the first energy source 116 may be moved in the direction of the weld 128 while the second energy source 122 may be moved in a direction 130 transverse to the direction of the weld 128. In this way, a normal speed of travel of the first energy source 116 can be maintained while the second energy source 122 may trail the first energy source 116 to heat the substrate 105 at regions, e.g., regions 132, outside the width (W) of the melt pool 100 to control the cooling rate of the melt pool as described herein. As shown, it is contemplated that the second energy source 122 may also heat an interior region of the melt pool 100.

In one embodiment, the regions 132 are areas disposed on both sides 123 of the melt pool 100, the sides being defined and extending between a leading edge and a trailing edge of the melt pool 100. The size of either of the regions 132 to be heated adjacent the melt pool 100 may be any size necessary to achieve the desired result and would be readily determinable by one skilled in the art.

In certain embodiments, the first amount of energy is applied in a direction of the weld 128 and the second amount of energy 124 is applied in a zig-zag pattern 134 as shown in FIG. 5, but the movement of the first energy source 116 and/or the second energy source 122 may follow any other suitable pattern.

In certain embodiments, to obtain the differential application of energy, the first amount of energy 118 has a greater power density and/or frequency than the second amount of energy 124 such that the first amount of energy 118 is effective to form the melt pool 100 while the second amount of energy 124 heats at least a region outside of a width (W) of the melt pool as was shown in FIG. 5.

In other embodiments, the amount of first energy 118 applied for a longer duration or at more frequent intervals than the second amount of energy 124 to achieve the desired effect. It is appreciated that the order of application of the first amount of energy 118 and the second amount of energy 124 is without limitation. For example, the second amount of energy 124 may be applied after initiation of the application of the first amount of energy 118 as is the case when the second energy source 122 applies the second amount of energy 124 behind a leading edge of the forming melt pool 100. Alternatively, the first amount of energy 118 may be applied at the same time as the second amount of energy 124 or after the application of the first amount of energy 118, for example. Also, the applications of energy may be either continuous or pulsed in delivery.

Figure 6:
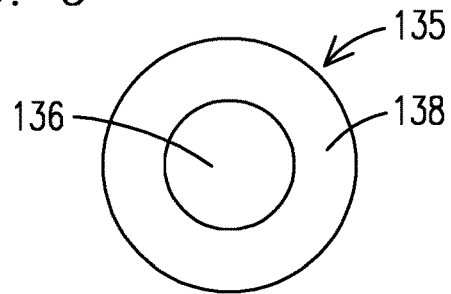
FIG. 6 illustrates a two-in-one fiber for use in an aspect of the present invention.

The above embodiment described the use of two energy sources 116, 122 to form the melt pool 100 with the contoured shape 102. It is appreciated, however, that a fewer or greater number of energy sources may be utilized. In one embodiment, a single energy source is utilized. In a particular embodiment, a single energy source is utilized along with a laser fiber to provide one or more energy beams on the substrate. Referring to FIG. 6, for example, a two-in-one fiber 135 may be used in combination with a single energy source, such as first energy source 116, to provide the melt pool 100 having the contoured shape 102. As shown in FIG. 6, for example, the two-in-one fiber 135 comprises an inner core 136 and an outer annulus 138 surrounding the inner core 136. Two-in-one fibers are commercially available from Trumpf, Inc. (Plymouth Township, Mich.). In an embodiment, the two-in-one fiber 135 provides a first amount of energy 118 through the inner core 136 and a second amount of energy 124 through the outer annulus 138 of the fiber 135. In this way, the first amount of energy 118 may be effective to form the melt pool 100 in the substrate 105 as described herein. In addition, utilizing a single energy source, the second amount of energy 124 may contact a region, e.g., regions 132, outside of the width (W) of the melt pool 100 so as to decrease a solidification of the melt pool 100 at least at the trailing edge region 106 thereof as described herein.

The production of the differing first and second amounts of energy may be accomplished as described above, such as by applying the first amount of energy 118 through the core 136 at a greater intensity or for a longer duration than the second amount of energy through the annulus 138. In a particular embodiment, for example, a keyhole 120 (FIG. 4) and an adjacent melt pool 100 may be formed by the first amount of energy 118 traveling through the inner core 136 and the width outside of the keyhole 120 and melt pool 100 may be heated by the second amount of energy 124 traveling through the outer annulus 138.

Figure 7:
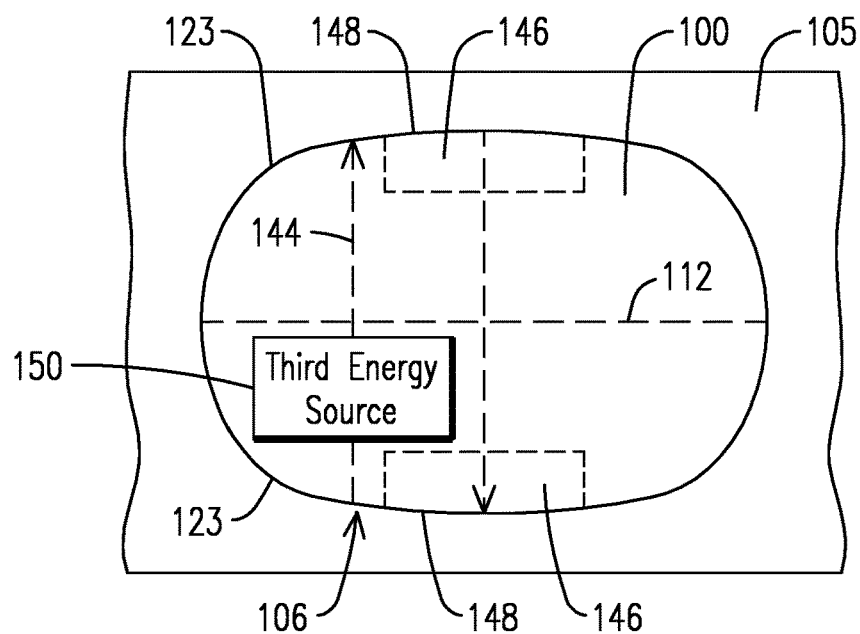
FIG. 7 illustrates a melt pool formed by applying additional energy to edges of the melt pool in accordance with an aspect of the present invention.

Referring now to FIG. 7, there is shown a melt pool 100 that may be formed in a substrate 105 via applying the first amount of energy 118 and the second amount of energy 124 applies energy to the substrate 105 outside of the width (W) of the melt pool 100 so as to decrease a solidification of the melt pool 100 at least at the trailing edge region 106 thereof as described herein (FIG. 5). Further, in this aspect, an additional amount of energy 144 may be applied to the melt pool 100 at any location, e.g., locations 146, within the melt pool 100 remote from the centerline 112 of the width (W) as is shown in FIG. 7. The additional energy 144 is further effective to heat the melt pool at edges 148 of the sides 123 thereof and decrease a solidification rate of the melt pool 100 at least at the edges 148. In an embodiment, the edges 148 include at least edges of the trailing edge region 106 of the melt pool 100. By applying the additional heat to at least edges 148 of the trailing edge region 106, the trailing edge region 106 is kept relatively hot, which results in the trailing edge region 106 cooling at substantially the same rate as the leading edge region of the melt pool 100 (or closer thereto than without application of the additional energy). This may result in favorably affecting a shape of the solidifying material, such as by providing a substantially symmetrical and oval shaped solidifying melt pool (2D) and a spherical, ellipsoidal, or the like surface-shaped solid/liquid interface (3D).

In an embodiment, a third energy source 150 applies the additional amount of energy 144 as shown in FIG. 7 while the first energy source 116 applies the first amount of energy 118 and the second energy source 122 applies the second amount of energy 124 as explained previously (FIG. 5). Alternatively, the additional energy 144 may be applied from time-shared energy from the first energy source 116 and/or the second energy source 122. The additional amount of energy 144 may be applied in any suitable pattern, for example, in a zig-zag pattern transverse to the centerline 112. Alternatively, the additional amount of energy 144 may be applied in the direction of the weld 128 (FIG. 4).

In certain embodiments, the second amount of energy 124 and additional energy 144 (if applied) may be oscillated in a side-to-side motion or even into and out of the plane of processing by their respective sources in in a desired direction (128 and/or 130, for example) to further refine solidifying grains and to scatter potential segregants or artifacts 114 from the centerline 112. In any case, the application of additional energies to the first amount of energy 118 is believed to result in the redirection and homogenization of weld stresses that otherwise concentrate with single source, unidirectional process energy application. Further, the additional application of energies as explained herein may promote a degree of post-weld stress relief heat treatment.

In still another embodiment, it is contemplated that a melt pool 100 having a contoured shape 102 with curvilinear and/or curviplanar solid/liquid interfaces may be formed without applying heat outside the width (W) of the melt pool 100. For example, a first energy source 118 applies energy to form at least a leading edge region of a melt pool 100 while a second energy source 122 applies energy to form a trailing edge region 106 of the melt pool as was shown and explained with respect to FIG. 5. However, in this instance, neither of the first and second energies are applied on the substrate outside the width (W) of the melt pool, but are still effective to provide the contoured shape 102 shown in FIGS. 3A-3B.

Figure 8:
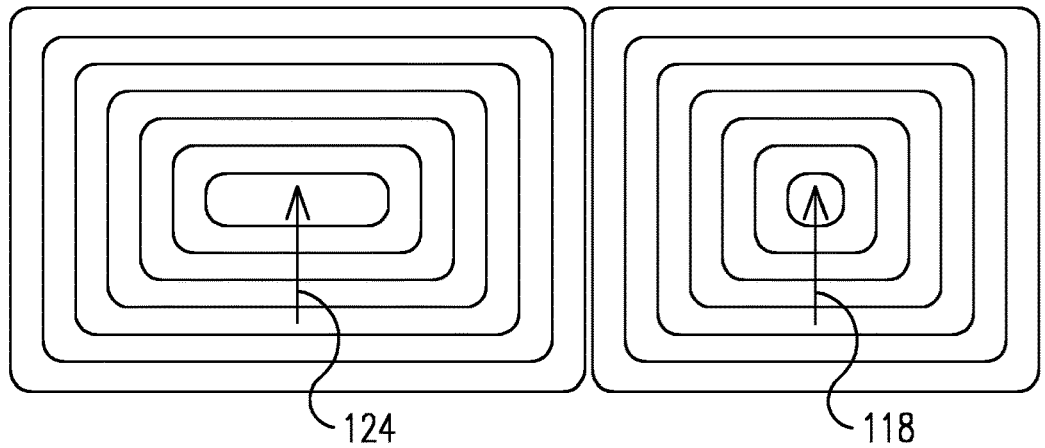
FIG. 8 illustrates the application of energy to form a contoured melt pool in accordance with an aspect of the present invention.

For example, the first amount of energy 118 and the second amount of energy 124 may each be applied in a concentric pattern as shown in FIG. 8. Any one path in the pattern may overlap with another. In addition, though each path is shown as being substantially linear in a direction at a point in time, it appreciated that the application of energy is not so limited. Side to side movement in any direction as the associated energy source or substrate moves in a particular direction is also contemplated. In an embodiment, the second amount of energy 124 is applied to a greater extent than the first amount of energy 118. For example, the second amount of energy 124 may be applied for a longer duration, at more frequent intervals, and/or to a greater surface area relative to the first amount of energy 118.

Figure 9A:
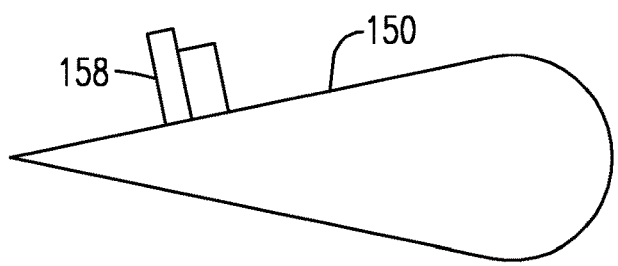
FIGS. 9A-9D illustrate the formation of a curvilinear and curviplanar melt pool (FIGS. 9C and 9D) and a prior art melt pool (FIGS. 9A-9B) in accordance with an aspect of the present invention.
Figure 9B:
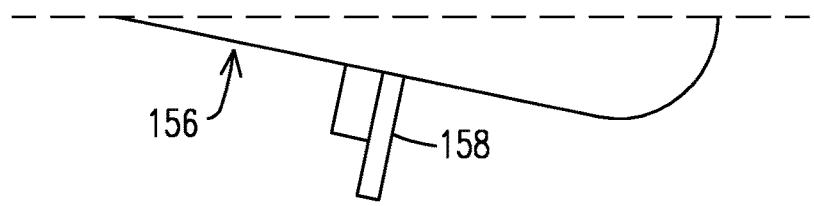
Figure 9C:
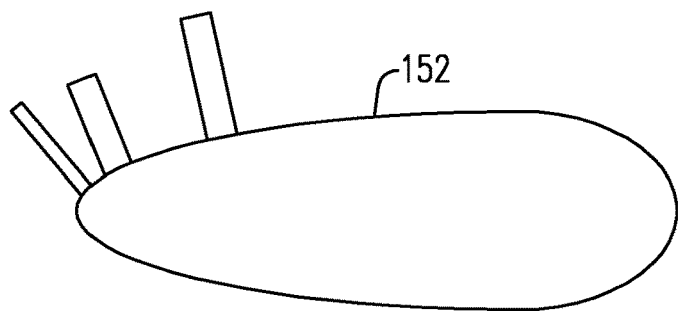

As mentioned, in any of the processes described herein, it is desirable to provide a melt pool 100 having a curvilinear and/or curviplanar solid/liquid interface. The term "curvilinear" refers to a curved line and the term "curviplanar" refers to a curved plane. By "curviplanar," it is also meant that there are no straight lines associated with a plane of the melt pool (below such as one might have with a cone or cylinder). Thus, as shown in FIGS. 9A and 9C, the melt pool viewed top down on the process plane (2D) could show a solid/liquid interface line that is either straight (linear) 150 or curved (rounded, oval, or the like (curvilinear 152)). In one aspect, the processes described herein provide a curvilinear solid/liquid interface.

Figure 9D:
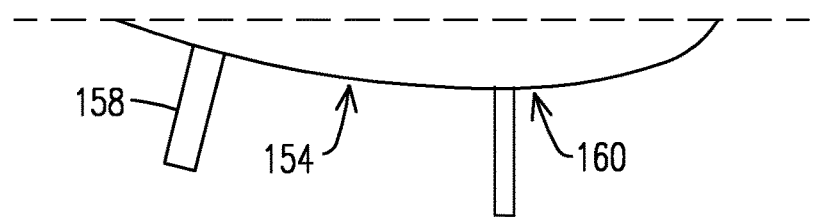

Further, if the melt pool 100 could be viewed in 3D, (e.g., by multi-positioned x-ray, etc.), then a solid/liquid interface surface may represent a plane 154. If the plane 154 were conical 156 (as one might expect from a tear-drop shaped weld pool) (see FIG. 9B), then it would have relatively straight sides as viewed in a transverse cross section and grains 158 would grow toward a common weld centerline. If the plane were curviplanar 160 as would be expected from an oval-shaped weld pool, for example, then its sides would be curved and grains 158 would have to have multiple orientations to grow from the solid/liquid interface as shown in FIG. 9D. Aspects of the present invention thus provide for a melt pool with a solid/interface that also has a curviplanar solid/liquid interface.

It is appreciated that the depth of the melt by any of the applied energies may be controlled so as to provide the desired shape within the depth of the melt pool. For example, this may be accomplished by controlling parameters of the energy application as would be understood by the skilled artisan, such as controlling pulse duration, pulse duration, frequency, and/or other any suitable parameters. In an embodiment, the melt pool 100 includes only minimal, if any, planar liquid/solid interfaces. In a particular embodiment, there are no planar liquid/solid interfaces of the melt pool 100.

For the processes described herein, the substrate 105 may comprise any material with which would benefit from the processes described herein. In certain embodiments, the substrate 105 comprises a superalloy material. The term "superalloy" is used herein as it is commonly used in the art to refer to a highly corrosion-resistant and oxidation-resistant alloy that exhibits excellent mechanical strength and resistance to creep even at high temperatures. Superalloys typically include a high nickel or cobalt content. Exemplary superalloys include, but are not limited to alloys sold under the trademarks and brand names Hastelloy, Inconel alloys (e.g., IN 738, IN 792, IN 939), Rene alloys (e.g., Rene N5, Rene 41, Rene 80, Rene 108, Rene 142, Rene 220), Haynes alloys, Mar M, CM 247, CM 247 LC, C263, 718, X-750, ECY 768, 262, X45, PWA 1483 and CMSX (e.g., CMSX-4) single crystal alloys, GTD 111, GTD 222, MGA 1400, MGA 2400, PSM 116, CMSX-8, CMSX-10, PWA 1484, IN 713C, Mar-M-200, PWA 1480, IN 100, IN 700, Udimet 600, Udimet 500 and titanium aluminide. Alternatively, the substrate 105 may comprise a ceramic material.

The one or more energy sources to form the melt pool 100 and to heat the regions 132 outside the width (W) or periphery 126 of the melt pool 100 may be any suitable energy source sufficient to accomplish the corresponding objective. In an embodiment, the one or more energy sources, either or both of sources 116, 122 for example, may be a laser energy source. It is appreciated that the skilled artisan would be able to identify the parameters and understand in what manner to vary the parameters so as to provide a melt pool 100 having a desired shape as described herein. Such parameters may include but are not limited to power density, pulse duration, pulse intervals, frequency, use of two-in-one fibers, the number of energy sources, use of hybrid (e.g., plasma and laser) sources, spacing between source and substrate, and the like.

In any of the embodiments described herein, it is appreciated that the depth of the melt pool 100 and thus the melting of the substrate 105 may be controlled as desired. As mentioned above, it is contemplated that a portion of the melt pool 100 (e.g., such as the region 140 shown in FIG. 3A) may have a shorter depth from a top surface of the substrate 105 relative to a remainder of the melt pool 100. In this way, a melt pool 100 may have a curvilinear and a curviplanar solid/liquid interface so as to improve the clearance of artifacts and porosity from the melt pool 100.

In certain embodiments, the amount of energy applied to the substrate 105 by the one or more energy sources is applied non-uniformly in some manner or includes a power gradient. For example, the energy source which forms the melt pool 100 may begin melting at a particular predetermined power density which is gradually increased over a predetermined time interval to form the keyhole and/or melt pool. This has the likelihood of reducing turbulence that typically causes defects, such as pores or other undesirable inclusions.

Further, although the contoured shape 102 of the melt pool 100 is shown as being a relatively elliptical shape from a top view, it is understood, however, that the present invention is not so limited. It is contemplated that other shapes may be formed and the melt pool 100 does not have the tear drop shape 22 so that artifacts 114 do not segregate along the centerline 30 of the melt pool 100 as was shown in FIG. 2. Also, the melt pool shape provided herein may be any one that provides reduced stress along the centerline and provides a greater likelihood for the escape of porosity from the melt pool prior to resolidification relative to a tear drop shaped melt pool.

To carry out the methods described herein, one or more controllers may be provided which is in direct or wireless communication with at least the one or more energy sources. For example, in FIG. 4, controller 142 is shown in communication with first energy source 116 and second energy source 122. The one or more controllers may be programmed with or may have software/hardware for controlling the energy sources. As such, the one or more controllers are configured to execute computer readable instructions for adjust parameters such as power density, pulse duration, frequency, and direction of travel of the energy source(s) or substrate as described above. In certain embodiments, one or more sensors, e.g., temperature sensors, are provided to monitor the melting process. The one or more sensors are also in communication with the controller 142. As such, the one or more controllers 142 may comprise one or more inputs for receiving information, such as temperature on the substrate or stress distribution surrounding the process location, from the one or more of the sensors described.

The controller 142 may comprise, for example, a special purpose computer comprising a microprocessor, a microcomputer, an industrial controller, a programmable logic controller, a discrete logic circuit or other suitable controlling device. In one embodiment, the controller 142 comprises input channels, a memory, an output channel, and a computer. As used herein, the term computer may include a processor, a microcontroller, a microcomputer, a programmable logic controller (PLC), an application specific integrated circuit, and other programmable circuits. The memory may include a computer-readable medium or a storage device, e.g., floppy disk, a compact disc read only memory (CD-ROM), or the like. In an embodiment, the controller 142 comprises computer readable instructions for performing any aspect of the methods or for controlling any aspect of the systems described herein.

Figure 1:
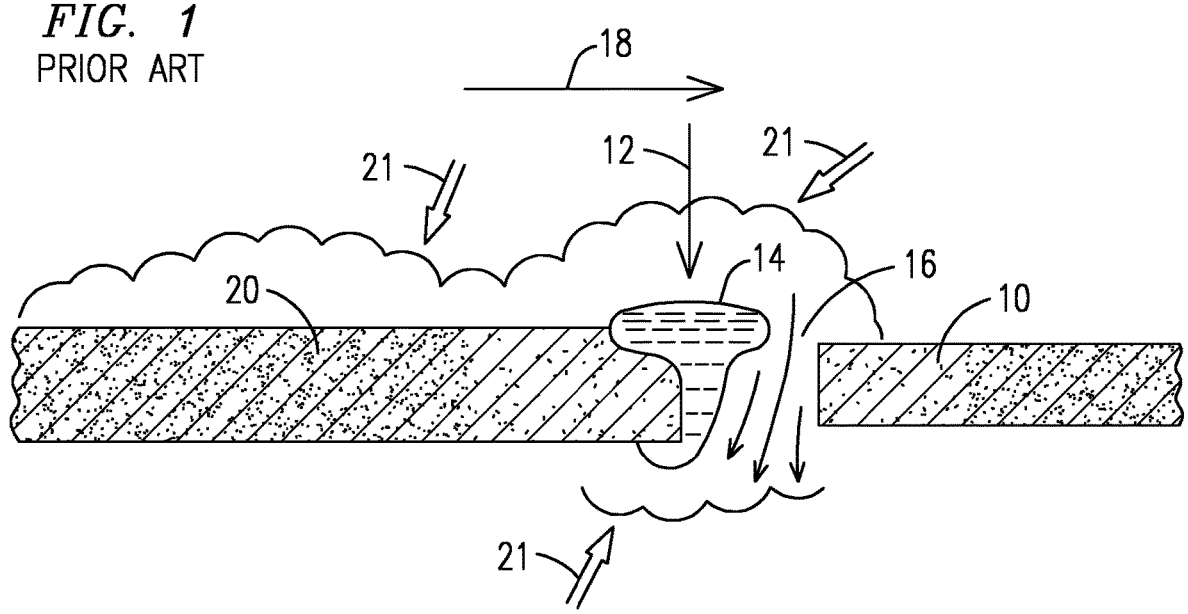
FIG. 1 illustrates the formation of a keyhole of a typical prior art keyhole welding process.

The processes described herein may take place under appropriate flux conditions to shield the melt pool 100 from atmospheric oxygen. In certain embodiments, the processes described herein may be performed in the presence of a flowing stream of argon or other inert gas (shown by reference numeral 21) over the melt pool 100 which shields the melt pool 100 from atmospheric oxygen as was shown in FIG. 1.

In other embodiments, a flux powder of a size and composition as described in U.S. Published Patent Application No. 2013/0136868, (the entirety of which is hereby incorporated by reference herein) may be introduced onto the substrate and/or the melt pool to similarly shield the melt pool from atmospheric oxygen. The use of a flux powder has a plurality of advantages associated therewith including the formation of a layer of slag at a top surface of the melt pool which aids in carrying away contaminants from the melt pool and in itself insulating and controlling heat dissipation, thereby influencing weld pool shape and stresses. In addition, if any of the processes described herein are to be utilized as an additive manufacturing process, the additive material may be in the form of a superalloy powder, which is applied to the melt pool or ahead of the formation of the melt pool as described in U.S. 2013/0136868.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process of welding a superalloy comprising:
applying a first amount of energy to a substrate comprised of the superalloy to form a melt pool along a length of the substrate and in a weld direction;
advancing the melt pool in the weld direction along the length via the first amount of energy, the melt pool having a width transverse to the weld direction; and
applying a second amount of energy to the substrate outside the width of the melt pool at a trailing edge of the melt pool, which second amount of energy causes, relative to a process without application of the second amount of energy:
broadening of the width of the melt pool at the trailing edge of the melt pool as the melt pool advances in the weld direction,
wherein the applying the first amount of energy and the second amount of energy creates a melt pool having a curviplanar solid/liquid interface, such that there are no planar solid/liquid interfaces, reducing segregation of artifacts and stress concentration along a centerline of the width,
wherein the second amount of energy is applied by moving a location at which the second amount of energy is applied along the substrate in a direction transverse to the weld direction, and wherein the second amount of energy does not melt the substrate.

2. The process of claim 1, wherein the first amount of energy and the second amount of energy are applied respectively by different energy sources.

3. The process of claim 1, wherein the first amount of energy and the second amount of energy are applied by time-shared energy from a same energy source.

4. The process of claim 1, wherein the second amount of energy is applied on both opposed sides of the width of the melt pool.

5. The process of claim 1, wherein the second amount of energy is applied following the initiation of the forming of the melt pool and behind a leading edge of the forming melt pool.

6. The process of claim 1, wherein the first amount of energy forms a keyhole in the melt pool, wherein broadening of the width of the melt pool at the trailing edge of the melt pool as the melt pool advances in the weld direction is behind the keyhole.

7. The process of claim 1, wherein the applying of the first and second amounts of energy are performed simultaneously via a two-in-one fiber, wherein the first amount of energy is provided through a central portion of the fiber, and wherein the second amount of energy is provided through an annular region about the central portion.

8. The process of claim 1, wherein the first and second amounts of energy are applied from at least one laser source.

\* \* \* \* \*